US012606213B2

(12) United States Patent
Ucar et al.

(10) Patent No.: US 12,606,213 B2
(45) Date of Patent: Apr. 21, 2026

(54) PROVIDING COMPENSATION MEASURES FOR PREVENTING UNEXPECTED ACTIONS BY A VEHICLE OPERATOR

(71) Applicant: Toyota Motor Engineering & Manufacturing North America, Inc., Plano, TX (US)

(72) Inventors: Seyhan Ucar, Mountain View, CA (US); Emrah Akin Sisbot, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 10 days.

(21) Appl. No.: 18/433,645

(22) Filed: Feb. 6, 2024

(65) Prior Publication Data

US 2025/0249938 A1 Aug. 7, 2025

(51) Int. Cl.
*B60W 60/00* (2020.01)
*B60W 50/14* (2020.01)

(52) U.S. Cl.
CPC ........ *B60W 60/0051* (2020.02); *B60W 50/14* (2013.01); *B60W 2555/20* (2020.02)

(58) Field of Classification Search
CPC ............. B60W 60/0051; B60W 50/14; B60W 2555/20; G06V 20/59; G08G 1/00; G08G 21/00; B60Q 9/00; B60Q 9/002; B60Q 9/008; G01W 1/02; A01G 15/00
USPC ......................................................... 701/24
See application file for complete search history.

(56) References Cited

U.S. PATENT DOCUMENTS

| | | | |
|---|---|---|---|
| 9,037,455 B1* | 5/2015 | Faaborg | G10L 21/00 |
| | | | 704/251 |
| 11,352,013 B1 | 6/2022 | Srinivasan et al. | |
| 11,380,198 B2 | 7/2022 | Ucar et al. | |
| 2017/0113664 A1 | 4/2017 | Nix | |
| 2017/0240185 A1* | 8/2017 | Li | G08B 7/06 |
| 2020/0216079 A1* | 7/2020 | Mahajan | B60W 60/0051 |
| 2020/0342230 A1 | 10/2020 | Tsai et al. | |
| 2020/0342235 A1 | 10/2020 | Tsai et al. | |

(Continued)

FOREIGN PATENT DOCUMENTS

| | | | | |
|---|---|---|---|---|
| EP | 4213124 A1 * | 7/2023 | | G01C 21/3676 |
| WO | WO-2018094374 A1 * | 5/2018 | | B60S 1/56 |

OTHER PUBLICATIONS

Madrid et al. "Matrix Profile XX: Finding and Visualizing Time Series Motifs of All Lengths using the Matrix Profile", 2019 IEEE International Conference on Big Knowledge. 2019.

(Continued)

*Primary Examiner* — Tuan C To
(74) *Attorney, Agent, or Firm* — Christopher G. Darrow; Darrow Mustafa PC

(57) ABSTRACT

Systems and methods described herein relate to implementing compensation strategy planning. In one embodiment, a method includes determining a set of characteristics to be encountered by a vehicle when providing a pending notification; retrieving an action avoidance entry based on the pending notification and the set of characteristics; selecting a compensation measure from the action avoidance entry; and causing the vehicle to undertake the compensation measure prior to the vehicle providing the pending notification.

20 Claims, 7 Drawing Sheets

(56) References Cited

U.S. PATENT DOCUMENTS

| | | | |
|---|---|---|---|
| 2020/0342274 A1 | 10/2020 | ElHattab et al. | |
| 2020/0342611 A1 | 10/2020 | ElHattab et al. | |
| 2020/0344301 A1 | 10/2020 | ElHattab et al. | |
| 2022/0068122 A1 | 3/2022 | Ucar et al. | |
| 2023/0021643 A1* | 1/2023 | Neumann | G08G 1/0969 |
| 2024/0239379 A1* | 7/2024 | Kuehner | B60W 60/0054 |
| 2024/0294188 A1* | 9/2024 | Kume | G08G 1/16 |

OTHER PUBLICATIONS

Mercer et al. "Matrix Profile XXIII: Contrast Profile: A Novel Time Series Primitive that Allows Real World Classification", 2021 IEEE International Conference on Data Mining. 2021.

* cited by examiner

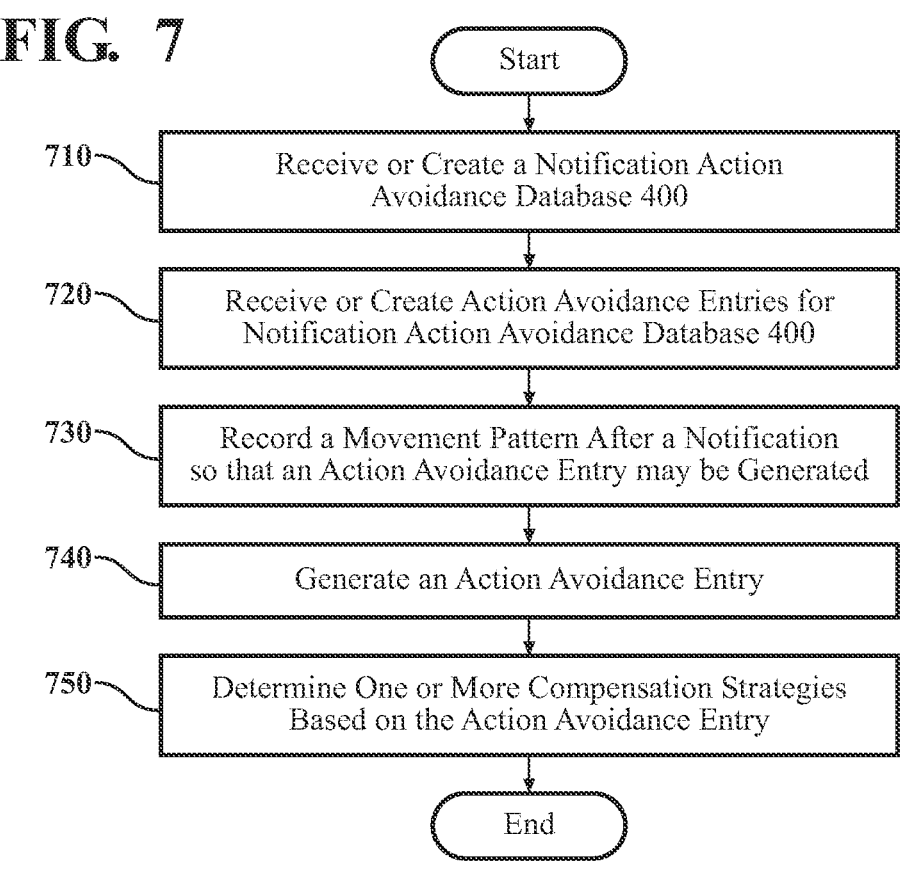

710 — Receive or Create a Notification Action Avoidance Database 400

720 — Receive or Create Action Avoidance Entries for Notification Action Avoidance Database 400

730 — Record a Movement Pattern After a Notification so that an Action Avoidance Entry may be Generated 740 — Generate an Action Avoidance Entry 750 — Determine One or More Compensation Strategies Based on the Action Avoidance Entry

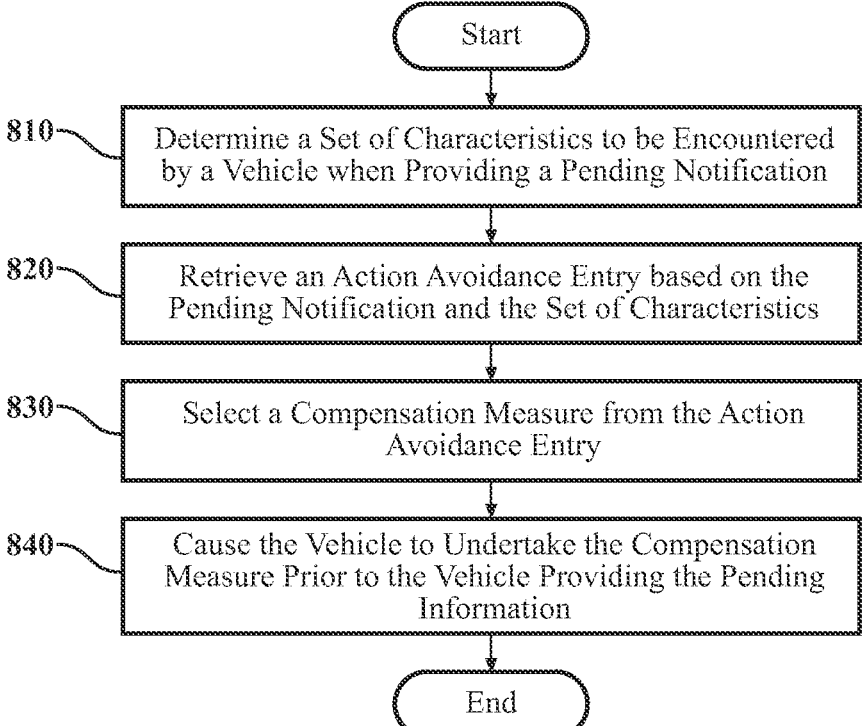

810 — Determine a Set of Characteristics to be Encountered by a Vehicle when Providing a Pending Notification 820 — Retrieve an Action Avoidance Entry based on the Pending Notification and the Set of Characteristics 830 — Select a Compensation Measure from the Action Avoidance Entry 840 — Cause the Vehicle to Undertake the Compensation Measure Prior to the Vehicle Providing the Pending Information

FIG. 8

PROVIDING COMPENSATION MEASURES FOR PREVENTING UNEXPECTED ACTIONS BY A VEHICLE OPERATOR

TECHNICAL FIELD

The subject matter described herein relates, in general, to strategies for providing compensation measures, and, more particularly, to preventing unexpected actions by a vehicle operator.

BACKGROUND

Vehicles can generate alerts and warnings to inform a vehicle operator of the risk of collision. For example, vehicles can monitor the behavior of surrounding vehicles and generate an alert with a lane change recommendation if a nearby vehicle is driving unsafely. The general assumption in these cases is that a driver can readily understand the alert and apply the given recommendation safely.

SUMMARY

In one embodiment, a compensation measure system is disclosed. The vehicle management system includes one or more processors and a memory communicably coupled to the one or more processors. The memory stores a command module including instructions that when executed by the one or more processors cause the one or more processors to determine a set of characteristics to be encountered by a vehicle when providing a pending notification; retrieve an action avoidance entry based on the pending notification and the set of characteristics; select a compensation measure from the action avoidance entry; and cause the vehicle to undertake the compensation measure prior to the vehicle providing the pending notification.

In one embodiment, a non-transitory computer-readable medium including instructions that when executed by one or more processors cause the one or more processors to perform one or more functions is disclosed. The instructions include instructions to determine a set of characteristics to be encountered by a vehicle when providing a pending notification; retrieve an action avoidance entry based on the pending notification and the set of characteristics; select a compensation measure from the action avoidance entry; and cause the vehicle to undertake the compensation measure prior to the vehicle providing the pending notification.

In one embodiment, a method for implementing compensation measure strategies is disclosed. In one embodiment, the method includes determining a set of characteristics to be encountered by a vehicle when providing a pending notification; retrieving an action avoidance entry based on the pending notification and the set of characteristics; selecting a compensation measure from the action avoidance entry; and causing the vehicle to undertake the compensation measure prior to the vehicle providing the pending notification.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 7 illustrate one example of a method for handling a notification action avoidance database.

FIG. 8 illustrate one example of a method for using a notification action avoidance database to implement a compensation measure.

DETAILED DESCRIPTION

Systems, methods, and other embodiments associated with compensation measures are described herein. With respect to collision avoidance systems, vehicles may detect a potential collision, notify the vehicle operator of the potential collision, and implement a collision avoidance strategy. However, notifications regardless of the context in which they may occur, collision avoidance or otherwise, may disrupt a vehicle operator's control of a vehicle.

As such, a compensation measure system may identify notifications that are associated with inducing undesirable movement patterns (e.g., swerving, failing to maintain speed). In addition, the compensation measure system may determine characteristics as to when the notification is likely to induce an undesirable movement pattern by a vehicle (e.g., weather characteristics, location characteristics, vehicle type characteristics). Finally, based on the notification, the movement pattern, and the characteristics relating to the probability of the movement pattern based on the notification, the compensation measure system may specify a compensation measure to ensure that the vehicle remains under proper control (e.g., lane keeping assistance). Once this is done, the vehicle when it is instructed to provide a notification can check whether the notification and characteristics as described may require the vehicle to implement a compensation measure. If so, it may implement the compensation measure prior to providing the notification.

Figure 1:
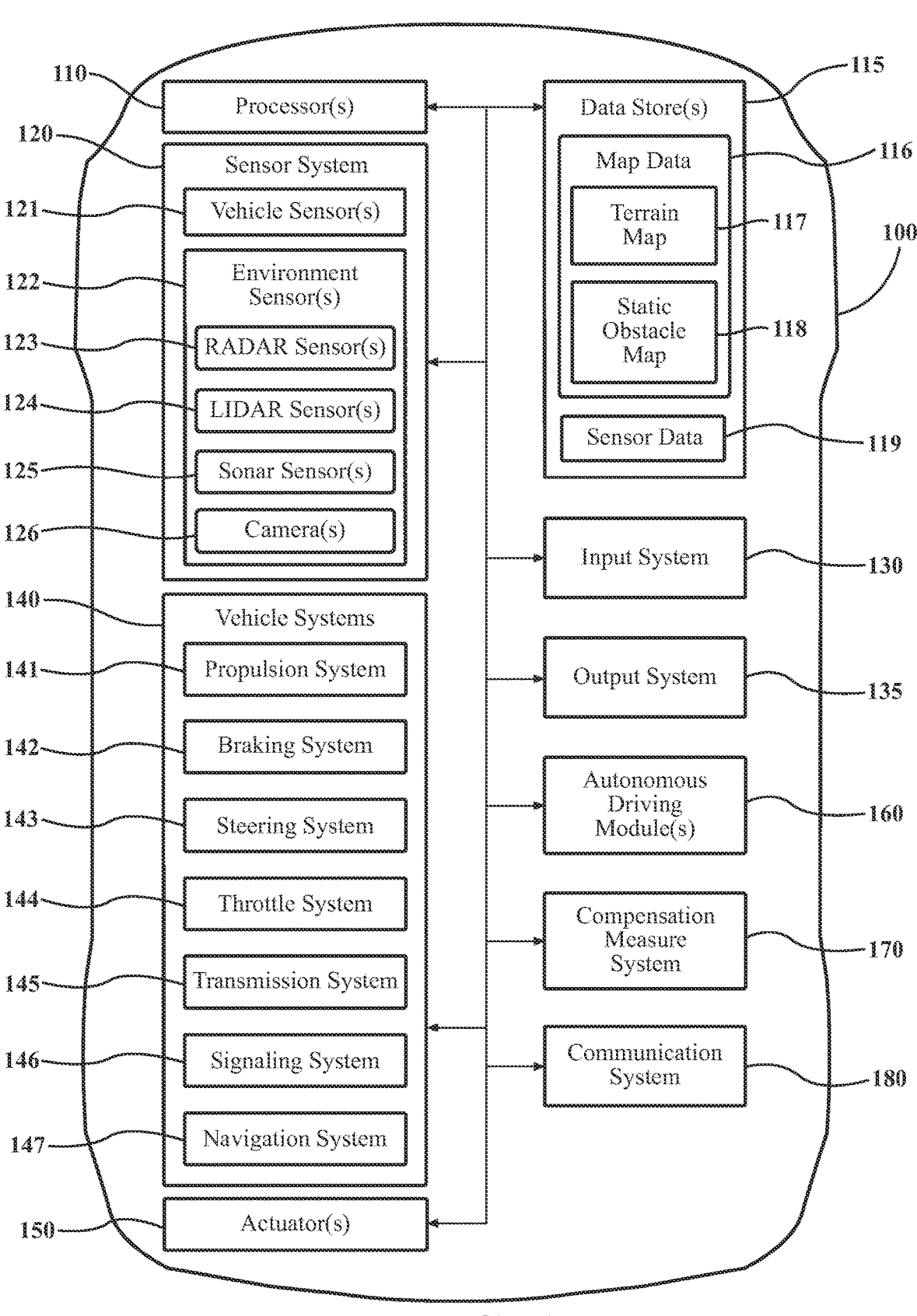
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, vehicle 100 is an automobile. While arrangements will be described herein with respect to automobiles, it will be understood that embodiments are not limited to automobiles. In some implementations, vehicle 100 may be any robotic device or form of motorized transport that, for example, includes sensors to perceive aspects of the surrounding environment, and thus benefits from the functionality discussed herein associated with compensation measure strategies. As a further note, this disclosure generally discusses vehicle 100 as traveling on a roadway with surrounding vehicles, which are intended to be construed in a similar manner as vehicle 100 itself. That is, the surrounding vehicles may include any vehicle that may be encountered on a roadway by vehicle 100.

Vehicle 100 also includes various elements. It will be understood that in various embodiments it may not be necessary for vehicle 100 to have all of the elements shown in FIG. 1. Vehicle 100 may have any combination of the various elements shown in FIG. 1. Further, vehicle 100 may have additional elements to those shown in FIG. 1. In some arrangements, vehicle 100 may be implemented without one or more of the elements shown in FIG. 1. While the various elements are shown as being located within vehicle 100 in FIG. 1, it will be understood that one or more of these elements may be located external to vehicle 100. Further, the elements shown may be physically separated by large distances. For example, as discussed, one or more components of the disclosed system may be implemented within a vehicle while further components of the system are implemented within a cloud-computing environment or other system that is remote from vehicle 100.

Some of the possible elements of vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, vehicle 100 includes a compensation measure system 170 that is implemented to perform methods and other functions as disclosed herein relating to implementing progressive compensation measure planning. As will be discussed in greater detail subsequently, compensation measure system 170, in various embodiments, is implemented partially within vehicle 100 and as a cloud-based service. For example, in one approach, functionality associated with at least one module of compensation measure system 170 is implemented within vehicle 100 while further functionality is implemented within a cloud-based computing system.

Figure 2:
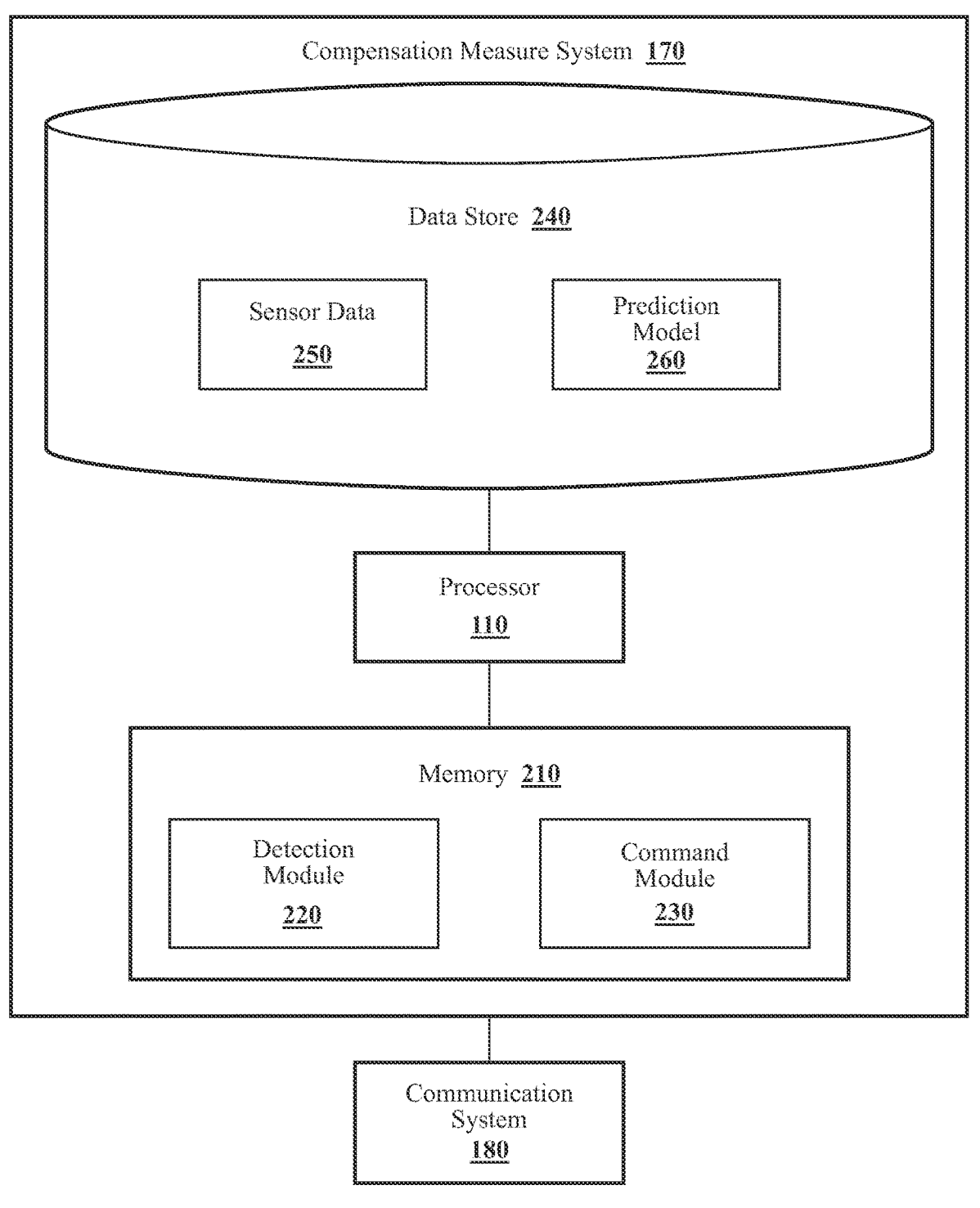
FIG. 2 illustrates one embodiment of a compensation measure system that is associated with implementing compensation measure strategies.

With reference to FIG. 2, one embodiment of compensation measure system 170 of FIG. 1 is further illustrated. Compensation measure system 170 is shown as including processor(s) 110 from vehicle 100 of FIG. 1. Accordingly, processor(s) 110 may be a part of compensation measure system 170, compensation measure system 170 may include a separate processor from processor 110($s$) of vehicle 100, or compensation measure system 170 may access processor 110($s$) through a data bus or another communication path. In one embodiment, compensation measure system 170 includes memory 210, which stores detection module 220 and command module 230. Memory 210 is a random-access memory (RAM), read-only memory (ROM), a hard-disk drive, a flash memory, or other suitable memory for storing detection module 220 and command module 230. Detection module 220 and command module 230 are, for example, computer-readable instructions that when executed by processor(s) 110 cause processor(s) 110 to perform the various functions disclosed herein.

Compensation measure system 170 as illustrated in FIG. 2 is generally an abstracted form of compensation measure system 170 as may be implemented between vehicle 100 and a cloud-computing environment. Accordingly, compensation measure system 170 may be embodied at least in part within a cloud-computing environment to perform the methods described herein.

With reference to FIG. 2, detection module 220 generally includes instructions that function to control processor(s) 110 to receive data inputs from one or more sensors of vehicle 100. The inputs are, in one embodiment, observations of one or more objects in an environment proximate to vehicle 100, other aspects about the surroundings, or both. As provided for herein, detection module 220, in one embodiment, acquires sensor data 250 that includes at least camera images. In further arrangements, detection module 220 acquires sensor data 250 from further sensors such as radar 123, LiDAR 124, and other sensors as may be suitable for identifying vehicles, locations of the vehicles, lane markers, crosswalks, traffic signs, vehicle parking areas, road surface types, curbs, vehicle barriers, and so on. In one embodiment, detection module 220 may also acquire sensor data 250 from one or more sensors that allow for implementing progressive compensation measure planning.

Accordingly, detection module 220, in one embodiment, controls the respective sensors to provide sensor data 250. Additionally, while detection module 220 is discussed as controlling the various sensors to provide sensor data 250, in one or more embodiments, detection module 220 may employ other techniques to acquire sensor data 250 that are either active or passive. For example, detection module 220 may passively sniff sensor data 250 from a stream of electronic information provided by the various sensors to further components within vehicle 100. Moreover, detection module 220 may undertake various approaches to fuse data from multiple sensors when providing sensor data 250, from sensor data acquired over a wireless communication link (e.g., v2v) from one or more of the surrounding vehicles, or from a combination thereof. Thus, sensor data 250, in one embodiment, represents a combination of perceptions acquired from multiple sensors.

In addition to locations of surrounding vehicles, sensor data 250 may also include, for example, odometry information, GPS data, or other location data. Moreover, detection module 220, in one embodiment, controls the sensors to acquire sensor data about an area that encompasses 360 degrees about vehicle 100, which may then be stored in sensor data 250. In some embodiments, such area sensor data may be used to provide a comprehensive assessment of the surrounding environment around vehicle 100. Of course, in alternative embodiments, detection module 220 may acquire the sensor data about a forward direction alone when, for example, vehicle 100 is not equipped with further sensors to include additional regions about the vehicle or the additional regions are not scanned due to other reasons (e.g., unnecessary due to known current conditions).

Moreover, in one embodiment, compensation measure system 170 includes a database 240. Database 240 is, in one embodiment, an electronic data structure stored in memory 210 or another data store and that is configured with routines that may be executed by processor(s) 110 for analyzing stored data, providing stored data, organizing stored data, and so on. Thus, in one embodiment, database 240 stores data used by the detection module 220 and command module 230 in executing various functions. In one embodiment, database 240 includes sensor data 250 along with, for example, metadata that characterize various aspects of sensor data 250. For example, the metadata may include location coordinates (e.g., longitude and latitude), relative map coordinates or tile identifiers, time/date stamps from when separate sensor data 250 was generated, and so on.

Detection module 220, in one embodiment, is further configured to perform additional tasks beyond controlling the respective sensors to acquire and provide sensor data 250. For example, detection module 220 includes instructions that may cause processor(s) 110 to form a notification action avoidance database as described herein. In some embodiments, detection module 220 may provide or package information relating to sensor data 250 for use with a notification action avoidance database, such as vehicle movement, control inputs, type of notification, vehicle type, driver profile, geographic location, weather conditions, traffic conditions, and so on. In some embodiments, detection module 220 may receive and store a notification avoid avoidance database.

Figure 3:
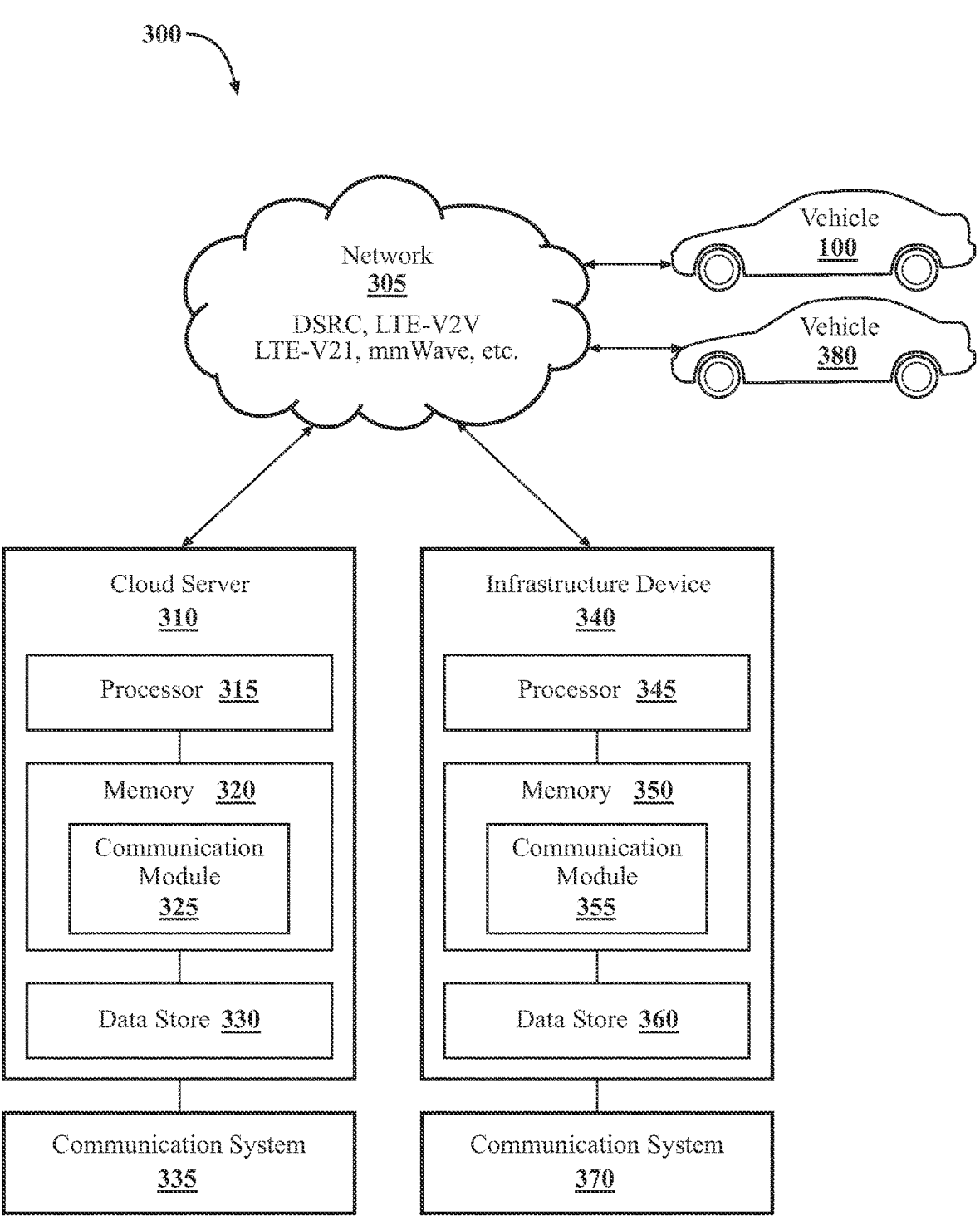
FIG. 3 illustrates one embodiment of a cloud computing environment within which the systems and methods described herein may operate.

In one embodiment, command module 230 generally includes instructions that function to control the processor(s) 110 or collection of processors in the cloud-computing environment 300 as shown in FIG. 3 for implementing progressive compensation measure planning.

With reference to FIG. 3, vehicle 100 may be connected to a network 305, which allows for communication between vehicle 100 and cloud servers (e.g., cloud server 310), infrastructure devices (e.g., infrastructure device 340), other vehicles (e.g., vehicle 380), and any other systems connected to network 305. With respect to network 305, such a network may use any form of communication or networking to exchange data, including but not limited to the Internet, Directed Short Range Communication (DSRC) service, LTE, 5G, millimeter wave (mmWave) communications, and so on.

Cloud server 310 is shown as including a processor 315 that may be a part of compensation measure system 170 through network 305 via communication unit 335. In one embodiment, cloud server 310 includes a memory 320 that stores a communication module 325. Memory 320 is a random-access memory (RAM), read-only memory (ROM), a hard-disk drive, a flash memory, or other suitable memory for storing communication module 325. Communication module 325 is, for example, computer-readable instructions that when executed by processor 315 causes processor 315 to perform the various functions disclosed herein. Moreover, in one embodiment, cloud server 310 includes database 330. Database 330 is, in one embodiment, an electronic data structure stored in a memory 320 or another data store and that is configured with routines that may be executed by processor 315 for analyzing stored data, providing stored data, organizing stored data, and so on.

Infrastructure device 340 is shown as including a processor 345 that may be a part of compensation measure system 170 through network 305 via communication unit 370. In one embodiment, infrastructure device 340 includes a memory 350 that stores a communication module 355. Memory 350 is a random-access memory (RAM), read-only memory (ROM), a hard-disk drive, a flash memory, or other suitable memory for storing communication module 355. Communication module 355 is, for example, computer-readable instructions that when executed by processor 345 causes processor 345 to perform the various functions disclosed herein. Moreover, in one embodiment, infrastructure device 340 includes a database 360. Database 360 is, in one embodiment, an electronic data structure stored in memory 350 or another data store and that is configured with routines that may be executed by processor 345 for analyzing stored data, providing stored data, organizing stored data, and so on.

Accordingly, in addition to information obtained from sensor data 250, compensation measure system 170 may obtain information from cloud servers (e.g., cloud server 310), infrastructure devices (e.g., infrastructure device 340), other vehicles (e.g., vehicle 380), and any other systems connected to network 305. For example, cloud servers (e.g., cloud server 310) may be used to perform the same tasks as described herein with respect to command module 230. For example, infrastructure device 340 may detect within its coverage area undesirable movement patterns among vehicles in relation to notifications being provided by such vehicles, such that infrastructure device 340 may determine compensation measures to correct such a problem using the systems and methods described herein. As another example, vehicles may form a peer-to-peer network to determine and share compensation measures using the systems and methods described herein.

Figure 4:
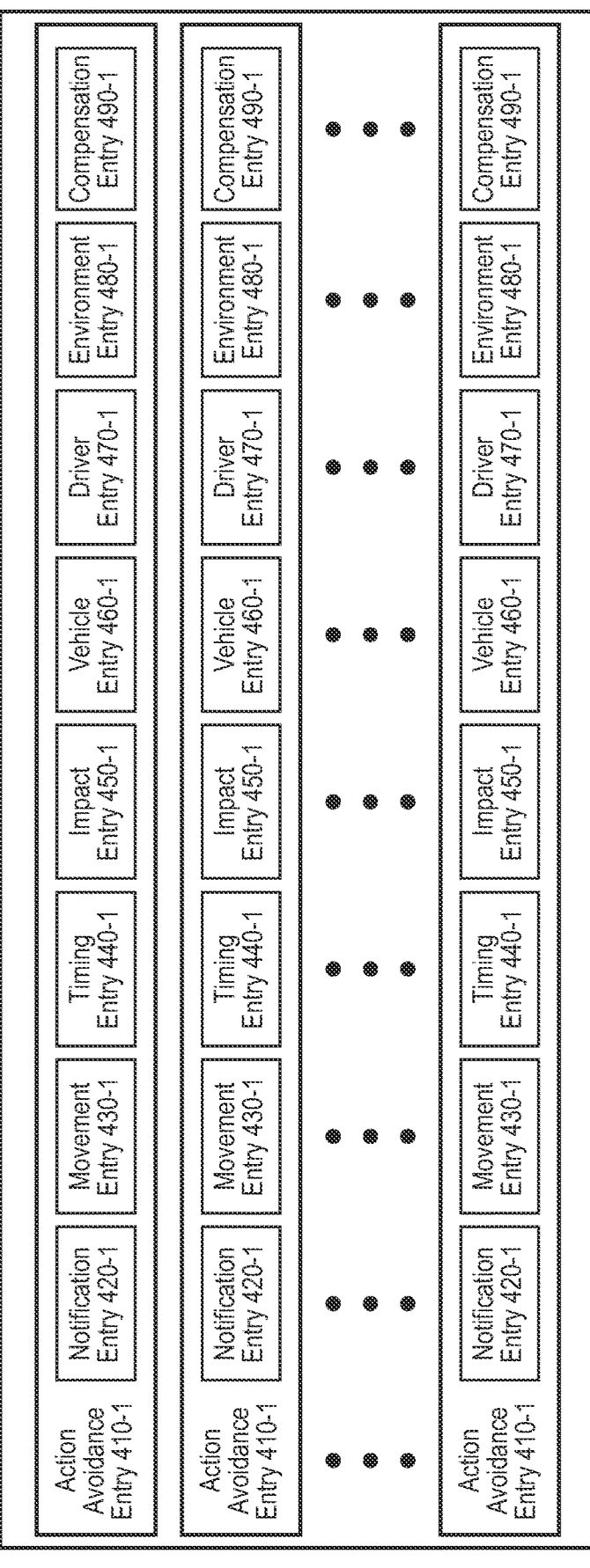
FIG. 4 illustrates one example of a notification action avoidance database.

In some embodiments, command module 230 may receive or notification action avoidance database 400 generate (e.g., via sensor data 250). An example of notification action avoidance database 400 is shown in FIG. 4, which may contain one or more action avoidance entries (e.g., action avoidance entry 410-1, action avoidance entry 410-2, . . . , action avoidance entry 410-n) as shown. Each action avoidance entry may have a corresponding notification entry, a movement entry, a timing entry, an impact entry, a vehicle entry, a driver entry, an environment entry, a compensation entry, and so on. For example, action avoidance entry 410-1 may contain notification entry 420-1, a movement entry 430-1, a timing entry 440-1, an impact entry 450-1, vehicle entry 460-1, a driver entry 470-1, an environment entry 480-1, and a compensation entry 490-1.

A notification entry may describe the characteristics of a notification to be provided to a vehicle occupant (e.g., a vehicle operator) of vehicle 100 or from vehicle 100 to a nearby entity (e.g., a nearby bicyclist, pedestrian, vehicle, etc.). The characteristics of the notification may include data specifying a message, a time of delivery, conditions for delivery, method of delivery, and so on that may serve to identify or distinguish the notification from any other notification. For example, a vehicle operator may react differently to a visual notification versus an audio notification, even if they serve to inform the vehicle operator of the same thing. In such an example, command module 230 may store the visual notification in a first notification entry of a first action avoidance entry and the audio notification in a second notification entry of a second action avoidance entry, thereby allowing command module 230 to distinguish between such notifications.

A movement entry may describe a movement pattern that may occur after a notification is provided (e.g., swerving, braking). For example, if a notification is displayed on a center console display that a device (e.g., wireless phone) has disconnected, a vehicle operator in reviewing the notification may allow the vehicle to drift out of its lane. Accordingly, in such an example a movement entry may be used to identify the movement pattern (e.g., drifting) in relation to the notification recorded (e.g., wireless disconnect) in an action avoidance entry. Any characteristics of a movement pattern necessary to identify a movement pattern may be stored in a movement entry. For example, control inputs (or a lack thereof) related to a movement pattern may be stored in a movement entry. In some embodiments, a movement pattern may also contain external characteristics necessary to evaluate whether a movement pattern occurred.

For example, a vehicle trajectory, lane boundary indicators, etc. may be provided to determine if the vehicle drifted into another lane or not.

A movement entry may also indicate that a movement pattern is a possible or expected response to an autonomous or semi-autonomous action taken by a vehicle. For example, an object on the road may require vehicles in autonomous or semi-autonomous to change lanes or undertake strong avoidance measures (e.g., swerving), which may then startle the vehicle operator and cause them to try and take control in a manner that requires intervention by the vehicle. If such an issue is detected by the first vehicle encountering the object, an action avoidance entry may be communicated to other vehicles that will subsequently encounter the object such that those vehicles may apply compensation measures in advance.

A timing entry may describe characteristics about how often a notification occurs or when such a notification is likely to occur (e.g., based on time, day of the week). For example, a timing entry may indicate how frequently a notification occurs at different times or different days of the week.

An impact entry may describe characteristics regarding the likely area of impact for the movement pattern identified by a movement entry. For example, movement patterns may be more likely to affect an area in front of, behind, or on either side of the vehicle to differing extents. Thus, information in an impact entry may allow command module 230 to better predict where a movement pattern may cause a conflict or present other concerns (e.g., loss of control due to road surface change). As another example, an impact entry may indicate the number of nearby lanes that may be at risk with respect to a movement pattern.

A vehicle entry may describe characteristics regarding vehicle 100 or another vehicle (e.g., one currently not in use) that may be relevant to the likelihood of the movement pattern occurring after a notification. For example, people who rent box trucks for the purpose of moving may have particularly difficulty with backing up such a vehicle or maneuvering through tight spaces, even if performing such maneuvers with their personal vehicles typically does not present a problem. In such a situation, it may be advantageous to provide notifications indicating such situations to the vehicle operators and have action avoidance entries for preventing undesirable movement patterns with such box trucks. As another example, a convertible with the top up presents considerably more blind spots to a vehicle operator than when the top is down. As such, a convertible implementing the systems and methods described herein may have more action avoidance entries with respect to vehicle entries for when the top is up than vehicle entries for when the top is down. As another example, action avoidance entries relating to notifications when towing (e.g., trailer sway) may be distinguished based on a vehicle entry for when a trailer is being towed.

A driver entry may describe characteristics regarding a vehicle operator, such as a lower or higher susceptibility to undesirable movement patterns after a notification, personal preferences of the vehicle operator with respect to system settings, or possible impairments that may affect operation of a vehicle (e.g., physical disability, native language that doesn't match locality, color blindness), and so on.

An environment entry may describe characteristics regarding environmental conditions that affect the likelihood of an undesirable movement pattern after a notification. For example, certain weather conditions (e.g., fog, rain, snow) may make undesirable movement patterns more likely. As another example, certain geographic locations may affect the likelihood of an undesirable movement pattern after a notification (e.g., travelling on a freeway vs. narrow urban roads, crossing a bridge over a river). As yet another example, certain traffic conditions may affect the likelihood of an undesirable movement pattern after a notification (e.g., traffic heading to or from an arena, rush hour traffic, construction traffic).

A compensation entry may describe compensation measures that may be undertaken prior to the notification. For example, prior to giving notification of a wireless disconnection for a wireless device, a compensation measure may instruct vehicle 100 to engage lane-keeping assistance. As another example, a compensation measure may instruct vehicle 100 to engage advanced cruise control before a vehicle operator is notified of a text message. In some embodiments, a compensation entry may describe multiple compensation measures that may be undertaken, such that command module 230 may determine which of the one or more compensation measures should be undertaken prior to notification.

In some embodiments, a compensation measure may be considered to be undertaken if command module 230 has been instructed to carry out a compensation measure prior to providing a notification, even if the compensation measure affects vehicle operation both before and after the notification is given or only after the notification is given. For example, a characteristic relating to the probability of an undesirable movement pattern in relation to a notification may only be resolved after the notification is given (e.g., the vehicle operator selecting to receive a call after notification). Such conditional characteristics for enabling post-notification actions given by a compensation measure may be stored in the associated environment entry, such that if the conditional characteristic is satisfied (e.g., vehicle operator chooses to receive the call) then the post-notification action specified by the compensation measure may be implemented (e.g., activate advanced cruise control).

In some embodiments, command module 230 may receive or generate pre-determined action avoidance entries for notification action avoidance database 400. For example, if testing has determined that a particular notification often results in a particular movement pattern, then an action avoidance entry may be created even if the vehicle operator does not produce such movement patterns. For example, customers who rent box trucks may often be so inexperienced with handling certain notifications that the fleet operator may require action avoidance entries in relation to such notifications be maintained in notification action avoidance database 400, regardless of the vehicle operator's driving experience. Accordingly, in such a scenario if a vehicle operator attempts to back up the box truck into a loading bay, a rear-facing camera may detect the loading bay and seek to give notification of a docking target. In view of such notification, command module 230 may find that a pre-determined action avoidance entry exists with a compensation entry describing that automated vehicle systems should be engaged to handle the docking maneuver.

As another example, the use of driving simulators may be used to locate situations presenting a particular problem for many drivers. For instance, before implementing rerouting of traffic due to construction, such rerouting may be tested in driving simulations. If a particular issue of concern is detected (e.g., a shift of traffic lanes at night causing confusion), a notification within an action avoidance entry may be created where the characteristics specifying the context in which the problem occurs are specified in the action avoidance entry as well (e.g., within the timing entry, location entry). An appropriate compensation measures may also be recorded in the compensation entry (e.g., activate lane keeping assistance). After which, such action avoidance entry may be made available (e.g., via infrastructure device 340), to vehicle 100 or other vehicles as they enter or pass through the construction zone. In some embodiments, command module 230 may provide a driving simulator as described herein, which may include not only allowing a user to evaluate possible problems, but also to review solutions to such problems as provided by one or more action avoidance entries.

In some embodiments, command module 230 may present a user interface for generating or editing action avoidance entry. For example, a vehicle operator with a physical disability (e.g., a missing arm) may wish to have certain notifications engage lane keeping assist because his or her disability may substantially impair his or her ability to operate vehicle 100 while responding to such a notification. As another example, command module 230 may receive via a user interface an indication that the vehicle operator or another user wishes to have command module 230 evaluate a movement pattern in response to a notification that recently occurred (e.g., within the last 30 seconds, since the more recent notification). For example, a spouse who does not appreciate how his or her partner responds to certain notifications (e.g., speeding up after receiving notification of a vehicle likely to move in front of vehicle 100) may instruct via a user interface command module 230 to generate an action avoidance entry for such a notification, then select a compensation measure for the action avoidance entry (e.g., maintain a minimum following distance).

In some embodiments, if vehicle 100 issues an external notification (e.g., verbally warning a bicyclist that they are too close, in a blind spot, or within the right-turn radius of a large vehicle), an appropriate action avoidance entry may contain a compensation measure to be implemented in relation to the external notification (e.g., maintain a safe distance from bicyclist; prohibit movement until a safe distance occurs), such that a driver may not be able to perform an undesirable movement pattern (e.g., right turn). Such an appropriate action avoidance entry with respect to a external notification may exist separately from an action avoidance entry relating to a internal notification because of differences in characteristics between the respective action avoidance entries. For instance, the internal notification may be first to activate as a bicyclist approaches vehicle 100, such that compensation measures in relation to the internal notification are performed by command module 230. However, should a bicyclist insist in placing him or herself in substantial danger relative to vehicle 100, the external notification may be given by command module 230 along with stronger compensation measures to prevent a more dangerous potential outcome.

In some embodiments, command module 230 may record a movement pattern after a notification. In addition to the movement pattern, command module 230 may also record any characteristics (e.g., timing, location) that may affect the likelihood of a movement pattern based on the notification. After recording one or more movement patterns after one or more notifications, command module 230 may generate one or more action avoidance entries based on analyzing the one or more patterns, one or more notifications, and any characteristics (e.g., timing, location) that may affect the likelihood of a movement pattern based on a notification. For example, time series analysis of such data may be used for generating contrast profiles that allow for determining undesirable movement patterns based on a notification as well as characteristics (e.g., timing, location) that affect the likelihood of the movement pattern based on the notification.

For example, based on a contrast profile command module 230 may determine that a disconnection warning is associated with a swerving movement pattern that repeats for three seconds when driving at night. As another example, command module 230 based on the contrast profile may also determine that an engine check notification is associated with an unstable vehicle speed for four seconds when at high speed on a highway (e.g., because the driver is trying to understand the warning and how to respond).

After command module 230 generates the classification data for the notification entry, movement entry, timing entry, impact entry, vehicle entry, driver entry, environment entry, or a combination thereof with respect to an action avoidance entry, command module 230 may determine one or more compensation measure strategies. For example, command module 230 may have a pre-determined set of advanced driving assistance, semi-autonomous, or autonomous functions that are specified to be used in response to a specific movement pattern (e.g., lane keeping assist for swerving, adaptive cruise control for unstable speed/distance). Accordingly, command module 230 may rely on such pre-determined arrangements if available for a movement pattern to determine one or more compensation measures. In some embodiments, a machine learning model (e.g., provided by prediction model 260) may be used to determine one or more compensation measures for a movement pattern. For example, inverse reinforcement learning or other similar approaches may be trained to compensate for the movement pattern by applying countermeasures, which once optimized may be recorded to a compensation entry in relation to the appropriate movement entry.

In some embodiments, command module 230 may receive or generate a notification to be provided by or via vehicle 100 (e.g., to a vehicle operator). Based on the notification, command module 230 may determine if an action avoidance entry exists for the notification within notification action avoidance database 400. If such an action avoidance entry exists, then command module 230 may determine if characteristics specified by the timing entry, vehicle entry, driver entry, environment entry, or other entries within the action avoidance entry are satisfied. If all necessary criteria within the action avoidance entry are satisfied, then command module 230 may implement a compensation measure as specified by the compensation entry.

In determining whether characteristics specified by the timing entry, vehicle entry, driver entry, environment entry, or other entries within the action avoidance entry are satisfied, command module 230 may predict the post-notification values of such characteristics based on pre-notification values of such characteristics. For example, command module 230 may receive an estimate of the trajectory of vehicle 100 to determine its location after post-notification.

In some embodiments, command module 230 may also utilize information in the movement entry or impact entry to determine a risk to vehicle 100 or to nearby vehicles or other road users. For example, command module 230 may communicate the nature of the risk (e.g., the possible movement pattern); the area of the risk (e.g., based on the impact entry); or an external warning (e.g., an audio command to stay clear).

Figures 5A, 5B, 5C:
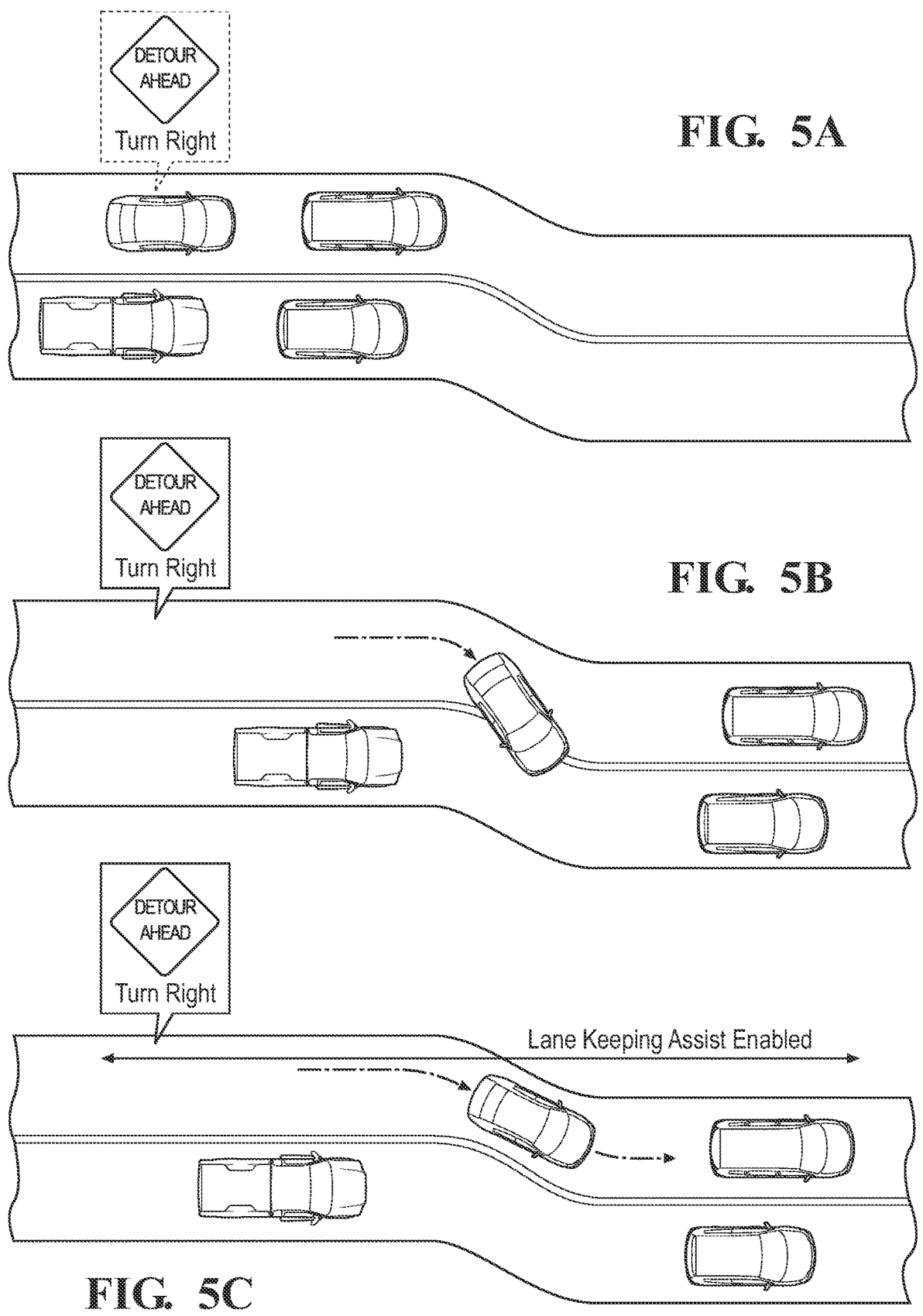
FIGS. 5A-C illustrate one example of implementating compensation measures.

FIGS. 5A-C illustrate an example of how command module 230 may use notification action avoidance database 400 with respect to a notification. As shown in FIG. 5A, vehicle 100 may be traveling along a restricted route in a construction area where the lane will turn quickly to the right. Before this occurs, vehicle 100 will provide a notification to the vehicle operator regarding the turn. However, in a situation of high speed and also high traffic limiting visibility, a notification may cause confusion rather than aid the driver, such that he or she is unprepared and overreacts at the turn. If so, an action avoidance entry indicates that, as shown in FIG. 5B, swerving to the right into an adjacent lane is an undesirable movement pattern associated with this notification when heavy traffic exists above a certain speed. Accordingly, as shown in FIG. 5C, prior to the notification a compensation measure system based on an action avoidance entry may instruct vehicle 100 to engage lane keeping assist to keep the vehicle in its lane during the turn.

Figure 6A:
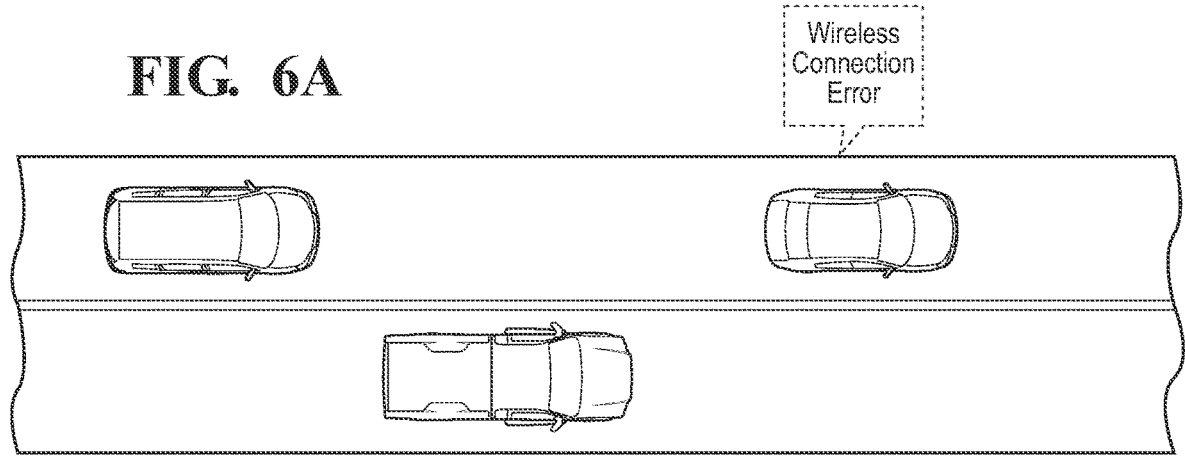
FIGS. 6A-C illustrate one example of implementating compensation measures.
Figure 6B:
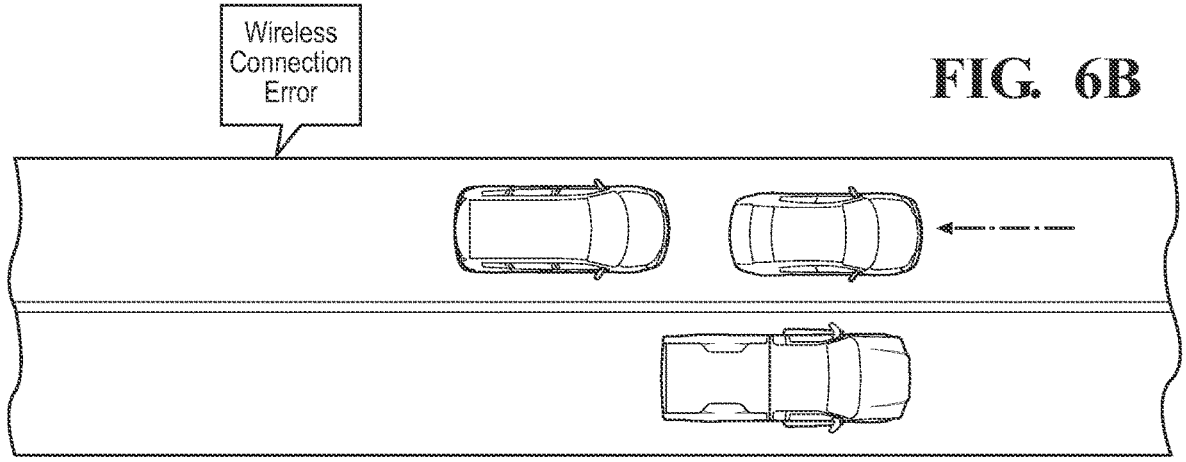
Figure 6C:
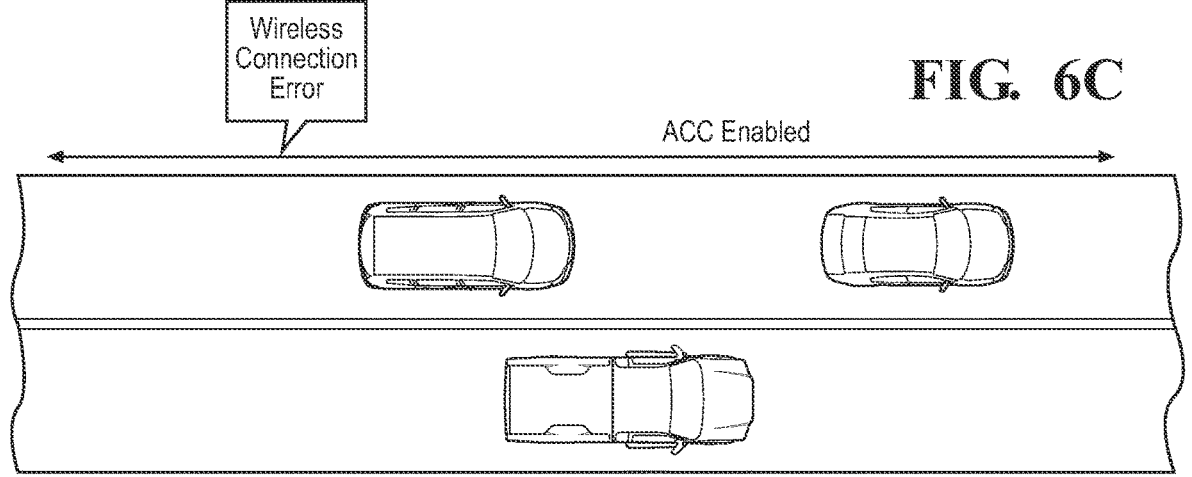

FIGS. 6A-C illustrate another example of how command module 230 may use notification action avoidance database 400 with respect to a notification. As shown in FIG. 6A, vehicle 100 may be traveling in front of another vehicle where a wireless connection error notification (e.g., due to a lost connection to a smartphone) will be provided to a vehicle operator. However, as shown in FIG. 6B, failing to maintain speed, which could result in a collision with a following vehicle, is an undesirable movement pattern associated with providing this notification. Accordingly, as shown in FIG. 6C, prior to the notification a compensation measure system based on an action avoidance entry may instruct vehicle 100 to engage adaptive cruise control to prevent such a collision.

FIG. 7 illustrates a flowchart of a method 700 that is associated with handling a notification action avoidance database 400. Method 700 will be discussed from the perspective of the compensation measure system 170 of FIGS. 1 and 2. While method 700 is discussed in combination with the compensation measure system 170, it should be appreciated that the method 700 is not limited to being implemented within compensation measure system 170 but is instead one example of a system that may implement method 700.

At 710, command module 230 may receive or create a notification action avoidance database 400. For example, command module 230 may receive the notification action avoidance database 400 via network 305, such as where a vehicle is configured for use by a new driver.

At 720, command module 230 may receive or create action avoidance entries for notification action avoidance database 400. For example, action avoidance entries may be created through testing on a remote system (e.g., via driving simulators) and then transferred to vehicle 100 via network 305. In some embodiments, action avoidance entries may be provided by infrastructure device 340, such as for notifications that may be provided within an area covered by infrastructure device 340.

At 730, command module 230 may record a movement pattern after a notification so that an action avoidance entry may be generated. In some embodiments, command module 230 may also record additional information associated with the movement pattern (e.g., characteristics that may affect the likelihood of a movement pattern based on a notification).

At 740, command module 230 may generate an action avoidance entry, such as by analyzing time series as described herein.

At 750, command module 230 may determine one or more compensation strategies based on the action avoidance entry. For example, command module 230 may have a pre-determined set of advanced driving assistance, semi-autonomous, or autonomous functions that are specified to be used in response to a specific movement pattern (e.g., lane keeping assist for swerving, adaptive cruise control for unstable speed/distance). Accordingly, command module 230 may rely on such pre-determined arrangements if available for a movement pattern to determine one or more compensation measures. In some embodiments, a machine learning model (e.g., provided by prediction model 260) may be used to determine one or more compensation measures for a movement pattern. For example, inverse reinforcement learning or other similar approaches may be trained to compensate for the movement pattern by applying countermeasures, which once optimized may be recorded to a compensation entry in relation to the appropriate movement entry.

FIG. 8 illustrates a flowchart of a method 800 that is associated with using a notification action avoidance database 400 to implement a compensation measure. Method 800 will be discussed from the perspective of the compensation measure system 170 of FIGS. 1 and 2. While method 800 is discussed in combination with the compensation measure system 170, it should be appreciated that the method 800 is not limited to being implemented within compensation measure system 170 but is instead one example of a system that may implement method 800.

At step 810, command module 230 may determine a set of characteristics to be encountered by a vehicle when providing a pending notification. For example, upon receiving the pending notification, command module 230 may determine the location of vehicle 100, the time of day, the speed of vehicle 100, and so on that may be relevant to characteristics recorded in an action avoidance entry.

At step 820, command module 230 may retrieve an action avoidance entry based on the pending notification and the set of characteristics. For example, command module 230 may find in notification action avoidance database 400 any action avoidance entries relating to the pending notification based on their notification entries, then evaluate which if any such action avoidance entries have values for characteristics therein that are satisfied by the set of characteristics obtained in step 810. In some embodiments, command module 230 may deem such satisfaction to have occurred by using thresholds, ranges of acceptable values, and so on such that a precise match is not necessary.

At step 830, command module 230 may select a compensation measure from the action avoidance entry. For example, if an action avoidance entry has been found satisfying the set of characteristics obtained in step 180, command module 230 may select a compensation measure as specified within the compensation entry of a such an action avoidance entry. In some embodiments, command module 230 may only select the compensation measure best fitting the current situation of vehicle 100 if a compensation entry has multiple compensation measures.

At step 840, command module 230 may cause the vehicle to undertake the compensation measure prior to the vehicle providing the pending notification.

FIG. 1 will now be discussed in full detail as an example environment within which the system and methods disclosed herein may operate. In some instances, vehicle 100 is configured to switch selectively between various modes, such as an autonomous mode, one or more semi-autonomous operational modes, a manual mode, etc. Such switching may be implemented in a suitable manner, now known, or later developed. "Manual mode" means that all of or a majority of the navigation/maneuvering of the vehicle is performed according to inputs received from a user (e.g., human driver). In one or more arrangements, vehicle 100 may be a conventional vehicle that is configured to operate in only a manual mode.

In one or more embodiments, vehicle 100 is an autonomous vehicle. As used herein, "autonomous vehicle" refers to a vehicle that operates in an autonomous mode. "Autonomous mode" refers to using one or more computing systems to control vehicle 100, such as providing navigation/maneuvering of vehicle 100 along a travel route, with minimal or no input from a human driver. In one or more embodiments, vehicle 100 is either highly automated or completely automated. In one embodiment, vehicle 100 is configured with one or more semi-autonomous operational modes in which one or more computing systems perform a portion of the navigation/maneuvering of the vehicle along a travel route, and a vehicle operator (i.e., driver) provides inputs to the vehicle to perform a portion of the navigation/maneuvering of vehicle 100 along a travel route.

Vehicle 100 may include one or more processors 110. In one or more arrangements, processor(s) 110 may be a main processor of vehicle 100. For instance, processor(s) 110 may be an electronic control unit (ECU). Vehicle 100 may include one or more data stores 115 for storing one or more types of data. Data store(s) 115 may include volatile memory, non-volatile memory, or both. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. Data store(s) 115 may be a component of processor(s) 110, or data store 115 may be operatively connected to processor(s) 110 for use thereby. The term "operatively connected," as used throughout this description, may include direct or indirect connections, including connections without direct physical contact.

In one or more arrangements, data store(s) 115 may include map data 116. Map data 116 may include maps of one or more geographic areas. In some instances, map data 116 may include information or data on roads, traffic control devices, road markings, structures, features, landmarks, or any combination thereof in the one or more geographic areas. Map data 116 may be in any suitable form. In some instances, map data 116 may include aerial views of an area. In some instances, map data 116 may include ground views of an area, including 360-degree ground views. Map data 116 may include measurements, dimensions, distances, information, or any combination thereof for one or more items included in map data 116. Map data 116 may also include measurements, dimensions, distances, information, or any combination thereof relative to other items included in map data 116. Map data 116 may include a digital map with information about road geometry. Map data 116 may be high quality, highly detailed, or both.

In one or more arrangements, map data 116 may include one or more terrain maps 117. Terrain map(s) 117 may include information about the ground, terrain, roads, surfaces, other features, or any combination thereof of one or more geographic areas. Terrain map(s) 117 may include elevation data in the one or more geographic areas. Terrain map(s) 117 may be high quality, highly detailed, or both. Terrain map(s) 117 may define one or more ground surfaces, which may include paved roads, unpaved roads, land, and other things that define a ground surface.

In one or more arrangements, map data 116 may include one or more static obstacle maps 118. Static obstacle map(s) 118 may include information about one or more static obstacles located within one or more geographic areas. A "static obstacle" is a physical object whose position does not change or substantially change over a period of time and whose size does not change or substantially change over a period of time. Examples of static obstacles include trees, buildings, curbs, fences, railings, medians, utility poles, statues, monuments, signs, benches, furniture, mailboxes, large rocks, hills. The static obstacles may be objects that extend above ground level. The one or more static obstacles included in static obstacle map(s) 118 may have location data, size data, dimension data, material data, other data, or any combination thereof, associated with it. Static obstacle map(s) 118 may include measurements, dimensions, distances, information, or any combination thereof for one or more static obstacles. Static obstacle map(s) 118 may be high quality, highly detailed, or both. Static obstacle map(s) 118 may be updated to reflect changes within a mapped area.

Data store(s) 115 may include sensor data 119. In this context, "sensor data" means any information about the sensors that vehicle 100 is equipped with, including the capabilities and other information about such sensors. As will be explained below, vehicle 100 may include sensor system 120. Sensor data 119 may relate to one or more sensors of sensor system 120. As an example, in one or more arrangements, sensor data 119 may include information on one or more LIDAR sensors 124 of sensor system 120.

In some instances, at least a portion of map data 116 or sensor data 119 may be located in data stores(s) 115 located onboard vehicle 100. Alternatively, or in addition, at least a portion of map data 116 or sensor data 119 may be located in data stores(s) 115 that are located remotely from vehicle 100.

As noted above, vehicle 100 may include sensor system 120. Sensor system 120 may include one or more sensors. "Sensor" means any device, component, or system that may detect or sense something. The one or more sensors may be configured to sense, detect, or perform both in real-time. As used herein, the term "real-time" means a level of processing responsiveness that a user or system senses as sufficiently immediate for a particular process or determination to be made, or that enables the processor to keep up with some external process.

In arrangements in which sensor system 120 includes a plurality of sensors, the sensors may work independently from each other. Alternatively, two or more of the sensors may work in combination with each other. In such an embodiment, the two or more sensors may form a sensor network. Sensor system 120, the one or more sensors, or both may be operatively connected to processor(s) 110, data store(s) 115, another element of vehicle 100 (including any of the elements shown in FIG. 1), or any combination thereof. Sensor system 120 may acquire data of at least a portion of the external environment of vehicle 100 (e.g., nearby vehicles).

Sensor system 120 may include any suitable type of sensor. Various examples of different types of sensors will be described herein. However, it will be understood that the embodiments are not limited to the particular sensors described. Sensor system 120 may include one or more vehicle sensors 121. Vehicle sensor(s) 121 may detect, determine, sense, or acquire in a combination thereof information about vehicle 100 itself. In one or more arrangements, vehicle sensor(s) 121 may be configured to detect, sense, or acquire in a combination thereof position and orientation changes of vehicle 100, such as, for example, based on inertial acceleration. In one or more arrangements, vehicle sensor(s) 121 may include one or more accelerometers, one or more gyroscopes, an inertial measurement unit (IMU), a dead-reckoning system, a global navigation satellite system (GNSS), a global positioning system (GPS), a navigation system 147, other suitable sensors, or any combination thereof. Vehicle sensor(s) 121 may be configured to detect, sense, or acquire in a combination thereof one or more characteristics of vehicle 100. In one or more arrangements, vehicle sensor(s) 121 may include a speedometer to determine a current speed of vehicle 100.

Alternatively, or in addition, sensor system 120 may include one or more environment sensors 122 configured to acquire, sense, or acquire in a combination thereof driving environment data. "Driving environment data" includes data or information about the external environment in which an autonomous vehicle is located or one or more portions thereof. For example, environment sensor(s) 122 may be configured to detect, quantify, sense, or acquire in any combination thereof obstacles in at least a portion of the external environment of vehicle 100, information/data about such obstacles, or a combination thereof. Such obstacles may be comprised of stationary objects, dynamic objects, or a combination thereof. Environment sensor(s) 122 may be configured to detect, measure, quantify, sense, or acquire in any combination thereof other things in the external environment of vehicle 100, such as, for example, lane markers, signs, traffic lights, traffic signs, lane lines, crosswalks, curbs proximate to vehicle 100, off-road objects, etc.

Various examples of sensors of sensor system 120 will be described herein. The example sensors may be part of the one or more environment sensor(s) 122, the one or more vehicle sensors 121, or both. However, it will be understood that the embodiments are not limited to the particular sensors described.

As an example, in one or more arrangements, sensor system 120 may include one or more radar sensors 123, one or more LIDAR sensors 124, one or more sonar sensors 125, one or more cameras 126, or any combination thereof. In one or more arrangements, camera(s) 126 may be high dynamic range (HDR) cameras or infrared (IR) cameras.

Vehicle 100 may include an input system 130. An "input system" includes any device, component, system, element or arrangement or groups thereof that enable information/data to be entered into a machine. Input system 130 may receive an input from a vehicle passenger (e.g., a driver or a passenger). Vehicle 100 may include an output system 135. An "output system" includes any device, component, or arrangement or groups thereof that enable information/data to be presented to a vehicle passenger (e.g., a person, a vehicle passenger, etc.).

Vehicle 100 may include one or more vehicle systems 140. Various examples of vehicle system(s) 140 are shown in FIG. 1. However, vehicle 100 may include more, fewer, or different vehicle systems. It should be appreciated that although particular vehicle systems are separately defined, each or any of the systems or portions thereof may be otherwise combined or segregated via hardware, software, or a combination thereof within vehicle 100. Vehicle 100 may include a propulsion system 141, a braking system 142, a steering system 143, throttle system 144, a transmission system 145, a signaling system 146, a navigation system 147, other systems, or any combination thereof. Each of these systems may include one or more devices, components, or combinations thereof, now known or later developed.

Navigation system 147 may include one or more devices, applications, or combinations thereof, now known or later developed, configured to determine the geographic location of the vehicle 100, to determine a travel route for vehicle 100, or to determine both. Navigation system 147 may include one or more mapping applications to determine a travel route for vehicle 100. Navigation system 147 may include a global positioning system, a local positioning system, a geolocation system, or any combination thereof.

Processor(s) 110, compensation measure system 170, automated driving module(s) 160, or any combination thereof may be operatively connected to communicate with various aspects of vehicle system(s) 140 or individual components thereof. For example, returning to FIG. 1, processor(s) 110, automated driving module(s) 160, or a combination thereof may be in communication to send or receive information from various aspects of vehicle system(s) 140 to control the movement, speed, maneuvering, heading, direction, etc. of vehicle 100. Processor(s) 110, compensation measure system 170, automated driving module(s) 160, or any combination thereof may control some or all of these vehicle system(s) 140 and, thus, may be partially or fully autonomous.

Processor(s) 110, compensation measure system 170, automated driving module(s) 160, or any combination thereof may be operable to control at least one of the navigation or maneuvering of vehicle 100 by controlling one or more of vehicle systems 140 or components thereof. For instance, when operating in an autonomous mode, processor(s) 110, compensation measure system 170, automated driving module(s) 160, or any combination thereof may control the direction, speed, or both of vehicle 100. Processor(s) 110, compensation measure system 170, automated driving module(s) 160, or any combination thereof may cause vehicle 100 to accelerate (e.g., by increasing the supply of fuel provided to the engine), decelerate (e.g., by decreasing the supply of fuel to the engine, by applying brakes), change direction (e.g., by turning the front two wheels), or perform any combination thereof. As used herein, "cause" or "causing" means to make, force, compel, direct, command, instruct, enable, or in any combination thereof an event or action to occur or at least be in a state where such event or action may occur, either in a direct or indirect manner.

Vehicle 100 may include one or more actuators 150. Actuator(s) 150 may be any element or combination of elements operable to modify, adjust, alter, or in any combination thereof one or more of vehicle systems 140 or components thereof to responsive to receiving signals or other inputs from processor(s) 110, automated driving module(s) 160, or a combination thereof. Any suitable actuator may be used. For instance, actuator(s) 150 may include motors, pneumatic actuators, hydraulic pistons, relays, solenoids, and piezoelectric actuators, just to name a few possibilities.

Vehicle 100 may include one or more modules, at least some of which are described herein. The modules may be implemented as computer-readable program code that, when executed by processor(s) 110, implement one or more of the various processes described herein. One or more of the modules may be a component of processor(s) 110, or one or more of the modules may be executed on or distributed among other processing systems to which processor(s) 110 is operatively connected. The modules may include instructions (e.g., program logic) executable by processor(s) 110. Alternatively, or in addition, data store(s) 115 may contain such instructions.

In one or more arrangements, one or more of the modules described herein may include artificial or computational intelligence elements, e.g., neural network, fuzzy logic, or other machine learning algorithms. Further, in one or more arrangements, one or more of the modules may be distributed among a plurality of the modules described herein. In one or more arrangements, two or more of the modules described herein may be combined into a single module.

Vehicle 100 may include one or more autonomous driving modules 160. Automated driving module(s) 160 may be configured to receive data from sensor system 120 or any other type of system capable of capturing information relating to vehicle 100, the external environment of the vehicle 100, or a combination thereof. In one or more arrangements, automated driving module(s) 160 may use such data to generate one or more driving scene models. Automated driving module(s) 160 may determine position and velocity of vehicle 100. Automated driving module(s) 160 may determine the location of obstacles, obstacles, or other environmental features including traffic signs, trees, shrubs, neighboring vehicles, pedestrians, etc.

Automated driving module(s) 160 may be configured to receive, determine, or in a combination thereof location information for obstacles within the external environment of vehicle 100, which may be used by processor(s) 110, one or more of the modules described herein, or any combination thereof to estimate: a position or orientation of vehicle 100; a vehicle position or orientation in global coordinates based on signals from a plurality of satellites or other geolocation systems; or any other data/signals that could be used to determine a position or orientation of vehicle 100 with respect to its environment for use in either creating a map or determining the position of vehicle 100 in respect to map data.

Automated driving module(s) 160 either independently or in combination with compensation measure system 170 may be configured to determine travel path(s), current autonomous driving maneuvers for vehicle 100, future autonomous driving maneuvers, modifications to current autonomous driving maneuvers, etc. Such determinations by automated driving module(s) 160 may be based on data acquired by sensor system 120, driving scene models, data from any other suitable source such as determinations from sensor data 250, or any combination thereof. In general, automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of vehicle 100, changing travel lanes, merging into a travel lane, and reversing, just to name a few possibilities. Automated driving module(s) 160 may be configured to implement driving maneuvers. Automated driving module(s) 160 may cause, directly or indirectly, such autonomous driving maneuvers to be implemented. As used herein, "cause" or "causing" means to make, command, instruct, enable, or in any combination thereof an event or action to occur or at least be in a state where such event or action may occur, either in a direct or indirect manner. Automated driving module(s) 160 may be configured to execute various vehicle functions, whether individually or in combination, to transmit data to, receive data from, interact with, or to control vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, or processes described above may be realized in hardware or a combination of hardware and software and may be realized in a centralized fashion in one processing system or in a distributed fashion where different elements are spread across several interconnected processing systems. Any kind of processing system or another apparatus adapted for carrying out the methods described herein is suited. A typical combination of hardware and software may be a processing system with computer-usable program code that, when being loaded and executed, controls the processing system such that it carries out the methods described herein. The systems, components, or processes also may be embedded in a computer-readable storage, such as a computer program product or other data programs storage device, readable by a machine, tangibly embodying a program of instructions executable by the machine to perform methods and processes described herein. These elements also may be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++, or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein may be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory communicably coupled to the processor and storing machine-readable instructions that, when executed by the processor, cause the processor to:
determine a set of characteristics to be encountered by a vehicle when providing a pending notification;

retrieve an action avoidance entry based on the pending notification and the set of characteristics;
select a compensation measure from the action avoidance entry; and
cause the vehicle to undertake the compensation measure prior to the vehicle providing the pending notification.

2. The system of claim 1, wherein the machine-readable instructions to determine a set of characteristics further includes determining a vehicle characteristic.

3. The system of claim 1, wherein the machine-readable instructions to determine a set of characteristics further includes determining a location.

4. The system of claim 1, wherein the machine-readable instructions to determine a set of characteristics further includes determining a weather condition.

5. The system of claim 1, wherein the machine-readable instructions that, when executed by the processor, further includes causing the processor to:
generate an action avoidance entry based on a set of recorded characteristics after a notification.

6. The system of claim 5, wherein the machine-readable instructions to generate the action avoidance entry based on the set of recorded characteristics after the notification further includes determining a second compensation measure.

7. The system of claim 1, wherein the machine-readable instructions that, when executed by the processor, further includes causing the processor to:
simulate an action avoidance entry.

8. A non-transitory computer-readable medium including instructions that when executed by one or more processors cause the one or more processors to:
determine a set of characteristics to be encountered by a vehicle when providing a pending notification;
retrieve an action avoidance entry based on the pending notification and the set of characteristics;
select a compensation measure from the action avoidance entry; and
cause the vehicle to undertake the compensation measure prior to the vehicle providing the pending notification.

9. The non-transitory computer-readable medium of claim 8, wherein the instructions to determine a set of characteristics further includes determining a vehicle characteristic.

10. The non-transitory computer-readable medium of claim 8, wherein the instructions to determine a set of characteristics further includes determining a location.

11. The non-transitory computer-readable medium of claim 8, wherein the instructions to determine a set of characteristics further includes determining a weather condition.

12. The non-transitory computer-readable medium of claim 8, further comprising instructions that when executed by one or more processors cause the one or more processors to:
generate an action avoidance entry based on a set of recorded characteristics after a notification.

13. The non-transitory computer-readable medium of claim 12, wherein the instructions to generate the action avoidance entry based on the set of recorded characteristics after the notification further includes determining a second compensation measure.

14. A method, comprising:
determining a set of characteristics to be encountered by a vehicle when providing a pending notification;
retrieving an action avoidance entry based on the pending notification and the set of characteristics;

selecting a compensation measure from the action avoid-
ance entry; and causing the vehicle to undertake the compensation mea-
sure prior to the vehicle providing the pending notifi-
cation.

15. The method of claim 14, wherein the step of deter-
mining a set of characteristics includes determining a
vehicle characteristic.

16. The method of claim 14, wherein the step of deter-
mining a set of characteristics includes determining a loca-
tion.

17. The method of claim 14, wherein the step of deter-
mining a set of characteristics includes determining a
weather condition.

18. The method of claim 14, further comprising:

generating an action avoidance entry based on a set of
recorded characteristics after a notification.

19. The method of claim 18, wherein generating the action
avoidance entry based on the set of recorded characteristics
after the notification further includes determining a second
compensation measure.

20. The method of claim 14, further comprising:

simulating an action avoidance entry.

\* \* \* \* \*